United States Patent [19]

Carp et al.

[11] 3,772,035

[45] Nov. 13, 1973

[54] METHOD OF MAKING A SIMULATED MEAT PRODUCT

[75] Inventors: Alan E. Carp; Douglas D. Mohar, both of Minneapolis, Minn.

[73] Assignee: General Mills, Inc., Minneapolis, Minn.

[22] Filed: May 27, 1970

[21] Appl. No.: 41,104

[52] U.S. Cl. ......................................... 99/17, 99/14
[51] Int. Cl. ............................................ A23j 3/00
[58] Field of Search ................................. 99/17, 14

[56] References Cited
UNITED STATES PATENTS

| | | | |
|---|---|---|---|
| 2,785,069 | 3/1957 | Dudman | 99/14 |
| 3,210,195 | 10/1965 | Kjelson et al. | 99/14 |
| 3,498,793 | 3/1970 | Page et al. | 99/17 |

*Primary Examiner*—A. Louis Monacell
*Assistant Examiner*—William Andrew Simons
*Attorney*—Anthony J. Juettner and Gene O. Enockson

[57] ABSTRACT

Method of preparing a simulated meat product wherein bundles of spun protein fibers are impregnated with an edible serum containing a heat coagulable binder, heat-setting the surfaces of these impregnated bundles while allowing the interior to remain capable of being set-up by heat, putting together a multiplicity of these surface heat-set bundles and then finally completely heat-setting and compressing these bundles.

9 Claims, No Drawings

METHOD OF MAKING A SIMULATED MEAT PRODUCT

The present invention relates to an improved process for preparing meat analogs and to the resulting improved products.

A variety of methods have been developed in the past several years or so to prepare products resembling natural cuts of meat from protein source material. One such general method involves the spinning and orienting of protein fibers and the attempting to fabricate or construct a meat analog from such oriented protein fibers and additive materials which generally include a heat coagulable binder. Means have been devised to substantially uniformly impregnate the oriented protein fibers with the additive materials. Other means have also been developed to heat-set the resulting impregnated fibers. While these procedures have been relatively successful, there remains the need for optional methods which can produce meat analogs which even more closely resemble various natural cuts of meat.

U.S. Pat. No. 3,498,793 to John A. Page and Robert C. Dechaine discloses and claims one effective way to prepare meat analog products. Such procedure involves forming an intimate mixture of oriented protein fibers and additive materials and then moving such mass along a confined passage while compressing the mass. Where the additive materials contain a heat coagulable binder, heat is applied to the moving mass. The resulting heat-set product may be ground and, as such, closely simulates natural ground meats, i.e., ground beef. It may likewise be cut into various sized chunks such as for use in stews and the like. In such applications, the more sophisticated and particular consumers may be able to differentiate the products' texture from that of chunks of natural meats. Thus, it would be desirable to provide an economical way to even more closely simulate the texture and structure of natural, cooked meat in which the fibers are bound together by connective tissue.

We have now discovered that fibrous products having improved characteristics closely simulating the texture and structure of cooked, natural meat can be prepared by heat-setting a multiplicity of surface heat-set bundles of impregnated oriented protein fibers while the same are being subjected to compressive forces, the fibers in each of the bundles being in substantial alignment. The process of our invention yields products that comprise laminar bundles of fibers that when teased apart or sheared in a longitudinal plane closely resemble the structure of cooked, natural meats. In one preferred embodiment of the invention, the surface heat-set bundles are placed in substantial alignment prior to the application of heat and compressive forces to cause the interior of the bundles to heat-set the bundles to adhere to one another. In such preferred embodiment, both the bundles and the fibers making up the bundles are in substantial alignment in the product and the same is characterized by a striated appearance generally along the lines of the initial surface heat-setting. In another preferred embodiment, the final heat-setting is carried out having the bundles in at least partial random alignment to each other and/or the bundles are caused to be in at least partial random alignment during the final heat-setting and compression. In such embodiment, a unique texture is presented wherein the bundles will not necessarily be on the same plane, i.e., the fibers in each of the bundles are in substantial alignment but the respective bundles themselves are in at least partial random alignment.

The starting edible protein fibers are prepared by forcing a spinning solution into a coagulating bath. The spinning solution is formed by dispersing an edible protein in an aqueous alkaline medium. A wide variety of protein materials which are edible can be used. Representative of such materials are the proteins isolated from soybeans, safflower seeds, corn, peanuts, peas and the like and animal proteins such as casein, etc. It is preferred to use the proteins isolated from oilseeds and it is especially preferred to use isolated soybean proteins. The latter material is preferred because of its commerical availability.

The edible protein is dispersed in the aqueous alkaline medium in varying amounts, such as from 10–35 percent by weight and preferably 15–25 percent by weight. The aqueous alkaline medium comprises water and an alkali metal hydroxide. It is preferred to use sodium hydroxide at concentrations of about 5 to 10 percent by weight. The pH of the spinning solution can vary within relatively wide limits but is generally in the range of 9 to 13.5. It is especially preferred that the edible protein and sodium hydroxide are present in the spinning solution in a weight ratio of 10–14 to 1. The temperature of the spinning solution is preferably within the range of about 20°–45°C. It is, of course, understood that the pH, temperature and concentrations of the alkali metal hydroxide and edible protein will vary somewhat depending on the particular materials employed. Also, the dispersion may amount to a colloidal solution and it is understood that the use of either the term spinning solution or the term spinning dispersion is inclusive of the other.

After formation of the spinning dispersion, it is forced through an extrusion device—i.e., a spinneret as used in the production of rayon—into an acid coagulating bath. The streamlets coming through the spinneret are thus precipitated in the form of filaments of fibers. The filaments issuing from the said spinneret, which is actually a die having from about 1,000 to 20,000 (and preferably 5,000 to 18,000) holes each on the order of 0.002–0.006 (preferably 0.003–0.005) inch in diameter will be of a diameter of about 0.002–0.006 (preferably 0.003–0.005) inch. It is also possible to have a series of spinnerets producing filaments from the spinning solution. Such spinnerets may have the same or different number of holes of the same or different diameter making it possible to directly produce tows of fibers having varying sizes and characteristics.

The coagulating bath is an aqueous solution of an acid which also preferably contains a salt. The salt (i.e., NaCl, for example) can be used in widely varying concentrations such as, for instance, about 0.5 to 12 percent by weight. The acid can be any of those normally used in the coagulation of proteins from their aqueous alkaline solutions. Representative acidic compounds are acetic acid, lactic acid, citric acid, phosphoric acid, adipic acid, sulfurous acid, hydrochloric acid and the like. The concentration of the said acid in the bath must be sufficient to coagulate the protein in the filaments issuing from the spinneret. This depends somewhat on the isoelectric point of the particular protein used in the formation of the spinning solution. Generally, the acid will be used in a concentration sufficient to maintain the pH of the coagulation bath below about 6.5 and preferably below about 4.0. Of course, the weight percent of the acids varies considerably because of their relative strenghts. Preferably, however, the acids will be present in an amount of about 0.5 to 10 percent by weight.

The spinning dispersion and fibers can be prepared batch-wise or in a continuous manner. Thus an aqueous slurry of the edible protein and the aqueous alkaline medium can be individually and continuously charged into a mixing device, the alkaline medium and the aqueous protein slurry can then be continuously intimately blended while being advanced to the discharge orifice of the mixing device and then the resulting spinning solution can be continuously extruded through an extrusion device—i.e., a spinneret—into the acid coagulating bath. The said mixing device is preferably a screw pump having mixing and metering sections. Such continuous method is further described with regard to the spinning of solutions or dopes of proteins in R. W. Westeen et al. U.S. Pat. No. 3,118,959, which disclosure is incorporated herein by reference.

The filaments (or tows thereof) are oriented by being stretched. Such stretching can be accomplished by various means such as pulling the fibers from the coagulating bath or baths over a take-away reel(s). Preferably, stretching tensions of about 50 to 400 percent are applied to the filaments or fibers. It is understood, however, that higher or lower tensions can be used and also that the stretching can be performed on a series of reels each with an increasing rate of speed or an increased stretching tension. It is further understood that the stretching of the filaments or fibers can take place in the acid coagulating bath, after emergence thereof from the said bath, or partly in the bath and partly after emergence from the bath.

The pH of the filaments or bundles thereof leaving the acid coagulating bath varies considerably depending on the particular acid employed, the concentration thereof, the amount of acid consumed (if not continuously replenished) and the alkalinity of the spinning dispersion. Under many optimum coagulating or precipitating conditions, the pH of the fibers will be below about 4.0, i.e., in the range of 1.0 to 3.5. Since most meats have a pH in the range of 4.0 to 6.5, the pH of the acid precipitated fibers is preferably raised to such range by water washing and/or neutralization. A suitable neutralizing bath is an aqueous solution of an alkali metal hydroxide or basic salt such as an alkali metal carbonate or bicarbonate, i.e., sodium bicarbonate. It is understood that the terms "neutralizing" and "neutralization" include any method of raising the pH of the fibers to the necessary level.

The fibers having the requisite pH upon leaving the acid coagulating bath or after having had the pH thereof raised to the necessary level have a high moisture content, i.e., 85 percent or above. Thus, it is preferred to remove a portion of the moisture content prior to further processing. Accordingly, the fibers can be passed through squeeze rolls to reduce the moisture level to about 60–80 percent by weight.

The fibers are then impregnated with an edible serum comprising a heat coagulable binder and preferably other additive materials. The binder preferably consists of egg albumen or a mixture of egg albumen with other materials including wheat gluten and particulate defatted oilseed materials. The latter type binder is disclosed in U.S. Pat. No. 3,343,963 to Niles A. Kjelson, which disclosure is incorporated herein by reference.

As indicated above, the composition or serum used to impregnate the fibers also preferably contains other additive materials. Thus the same may comprise flavoring agents, coloring agents, oils and fats and the like. Various meat flavors which are available commercially can be added. Representative thereof are bouillon cubes having chicken, beef and meat flavors. Synthetic ham, bacon and sausage flavors may also be used. NaCl and other salts can be adeed, i.e., monosodium glutamate. The coloring agents may be dyes or other materials, i.e., cocoa, caramel.

Vegetable oils and animal fats and oils can also be used in the serum. Representative thereof are soybean oil, cottonseed oil, corn oil, coconut oil, palm kernel oil, olive oil, peanut oil, sesame seed oil, safflower oil, tallow, lard, chicken fat, butter, cod-liver oil and the like. The said oils and fats may be partially or fully hydrogenated.

Impregnation of the fibers can be accomplished by hand, such as by dipping the fibers or tows thereof in the aqueous edible serum. A number of other procedures have also been developed to continuously impregnate the fibers with the serum. One such procedure is that disclosed in U.S. Pat. No. 3,314,356 to Robert C. Dechaine and Robert W. Callaghan, which disclosure is incorporated herein by reference.

The preparation of the fibers, orientation thereof and impregnation of the same are known procedures and do not form a part of the present invention. As indicated above, our invention relates to the process where impregnated bundles of such fibers (where the fibers are in substantial alignment) are caused to be surface heat-set while the interior thereof remains capable of being set-up and a multiplicity of said surface set-up bundles are subjected to further heat-setting while being subjected to compressive forces.

While the fibers in the bundles can be aligned by hand or, in fact, made up by combining a multiplicity of fibers either before or after impregnation with the edible serum, it is preferred to work with tows or multiplicity of tows of the fibers of the dimensions leaving the acid coagulating bath. In general, however, it is only necessary that the bundles be of sufficient cross-section to be handled and further processed in a practical manner and that surfaces thereof can be heat-set while the interiors remain capable of being finally heat-set. Likewise, the fibers or tows thereof can be cut to desired lengths prior to impregnation, after impregnation or after the initial surface heat-setting. Long strips of the surface heat-set fiber bundles can also be processed in accordance with the invention. Thus, tows of the fibers can be continuously impregnated and surface heat-set and then a multiplicity of said strips can be subjected to final heat-setting and compression. The surface heat-set bundles can also be slit lengthwise prior to the final heat-setting and compression.

The temperatures used in the surface and final heat-setting operations will be sufficient to cause coagulation of the heat coagulable protein. Normally, temperatures of at least about 125°F., and preferably at least about 140°F., will be used. Temperatures so high as to cause degradation or burning of the product should be avoided. The partial heat-setting is preferably carried out at a higher temperature and for a shorter period of time than the final heat-setting. Too high a temperature in the final heat-setting could cause the surface of the product to burn prior to the heat-setting of the interior thereof.

As indicated, the final heat-setting step is accomplished while the multiplicity of surface heat-set fiber bundles are being subjected to compression. Sufficient compression will be used to cause the surface heat-set fiber bundles to adhere to one another in the final product. The compression is sufficient to force a portion of the non-set binder from the centers or interior of the surface heat-set bundles. The final heat-setting will then cause the individual bundles to adhere to each other.

As also indicated above, the final heat-setting and compression step may preferably be accomplished in such a manner that the surface heat-set fiber bundles are in varying degrees of randomness, that is, they are all not aligned with each other. One preferred procedure to accomplish this result is to carry out the final heat-setting and compression step in the auger apparatus (including heating means) disclosed in U.S. Pat. No. 3,498,793 referred to hereinabove, which disclosure is incorporated herein by reference. The multiplicity of surface heat-set bundles are fed into the auger and then moved in plug form along a confined passage while being finally heat-set. While being moved along such confined passage, the bundle pieces are progressively compressed to cause the bundle pieces to adhere in a random fashion to each other while retaining the substantial alignment of the fibers in each such bundle. The compression also causes the food product to achieve the density of natural cuts of meat.

The heat-set and compressed product can be cut or sliced into any desired size pieces or chunks. As such, the pieces or chunks can be frozen and marketed in the frozen state. They can also be used directly in canning operations, such as in producing beef stews and the like. Additionally, they can be dried by conventional means and can be marketed alone in such dehydrated state or in combination with other dry food ingredients.

The following Examples illustrate preferred embodiments of the invention without being limiting.

EXAMPLE I

Tows of soy protein fibers were prepared from isolated soy protein by the procedure of the Example of the aforementioned R. W. Westeen et al. U.S. Pat. No. 3,118,959. The fibers in the tows were oriented by being stretched over take-away reels and then neutralized to a pH of about 4–6. Excess moisture was squeezed from the tows and then the same were continuously impregnated with the following identified serum so that the resulting impregnated tows had the composition as follows:

| Ingredients | % By Weight |
| --- | --- |
| Fiber (70% by wt. moisture) | 40.00 |
| Serum | |
| H₂O | 28.00 |
| Tallow | 14.00 |
| Egg albumen (dried) | 4.50 |
| NaCl | 1.30 |
| Brown sugar | 1.30 |
| Onion powder | 0.75 |
| Powdered beef flavoring | 2.50 |
| 1% Red 3 coloring | 0.09 |
| Cocoa | 0.10 |
| Caramel | 0.18 |
| Non-fat dry milk | 7.28 |
| | 100.00 |

The impregnated continuous tows were cut to fit 15½ by 12 inch teflon-lined cookie pans. Each tow piece was flattened out on the pans to a width of 2 inches with five or six flattened tow pieces per pan. The pans were placed in a 400°F. oven for about 2–4 minutes, which period of time was just long enough to heat-set the surfaces of the tow pieces rather firmly while the interior thereof was not heat-set at all. The surface set-up tow pieces were then cut lengthwise into strips about one-fourth inch wide and fed into the auger apparatus of the aforementioned Page and Dechaine U.S. Pat. No. 3,498,793 (operating at a compression ratio of approximately 2:1, a shaft speed of 5 rpm and a jacket steam pressure of 14 psig). The product was thus compressed and finally heat-set (product temperature reached 180°F.) in the auger apparatus. Examination of slices of the same as it exited from the auger showed a random arrangement of fiber bundles with the fibers in the separate bundles being substantially aligned. The product closely resembled slices of natural roasted quality beef. Excellent products of the same characteristics were also obtained when the tows of fibers were continuously impregnated with the serum, continuously surface heat-set and fed continuously through the heated auger apparatus.

EXAMPLE II

A multiplicity of surface heat-set impregnated fiber tows prepared as in Example I were placed in substantial alignment and then the bundles were compressed using a pressure of 75–100 psig while being finally heat-set by application of atmospheric steam (to an interior product temperature of 185°F.). When cooled, the product was sliced transversely to yield slices which closely resembled slices of roast beef of high quality.

The embodiments of the invention in which an exclusive property or privledge is claimed are defined as follows:

1. A process for preparing a fibrous food product which comprises impregnating bundles of oriented, edible protein fibers with an edible serum containing a heat coagulable binder, heating such bundles of impregnated fibers where the fibers are in substantial alignment to heat-set the surfaces thereof while the interior remains capable of being set-up by heat, putting together a multiplicity of such surface heat-set bundles and then finally heat-setting and compressing said multiplicity of surface heat-set bundles, said final heat-setting and compressing being sufficient to force a portion of the non-set binder from the interior of the surface heat-set bundles and cause the individual fiber bundles to adhere to each other.

2. The process of claim 1 wherein the final heat-setting and compressing is accomplished while the surface heat-set bundles are in substantial alignment.

3. The process of claim 1 wherein the final heat-setting and compressing is accomplished while the surface heat-set bundles are in at least partial random alignment.

4. The process of claim 3 wherein the random alignment of the bundles is obtained while the said multiplicity of bundles are being forced through a heated, confined passage.

5. The process of claim 4 wherein the heat coagulable binder is egg albumen.

6. The process of claim 5 wherein the fibers are soy protein fibers.

7. The process of claim 6 wherein the edible serum also contains flavoring and coloring agents and a fat.

8. The process of claim 1 wherein the bundles of fibers are continuously impregnated and continuously surface heat-set prior to the final heat-setting and compressing.

9. The process of claim 1 wherein the surface heat-set bundles are slit lengthwise prior to the final heat-setting and compressing.

* * * * *

PO-1050
(5/69)

UNITED STATES PATENT OFFICE
CERTIFICATE OF CORRECTION

Patent No. 3,772,035             Dated November 13, 1973

Inventor(s) Alan E. Carp, Douglas D. Mohar and Stanley C. Rustad

It is certified that error appears in the above-identified patent and that said Letters Patent are hereby corrected as shown below:

Title page: Stanley C. Rustad should be added as an inventor. Column 1, line 11, "the" should read -- then --; line 19, "optional" should read -- operational --; line 55, "heat-set the" should read -- heat-set and the --. Column 2, line 67, "coagulation" should read -- coagulating --. Column 3, line 3, "strenghts" should read -- strengths --. Column 4, line 11, "adeed" should read -- added --; line 47, "that surfaces" should read -- that the surfaces --. Column 5, line 64, "Red 3" should read -- Red #3 --.

Signed and sealed this 9th day of July 1974.

(SEAL)
Attest:

McCOY M. GIBSON, JR.
Attesting Officer

C. MARSHALL DANN
Commissioner of Patents